Figure 4:
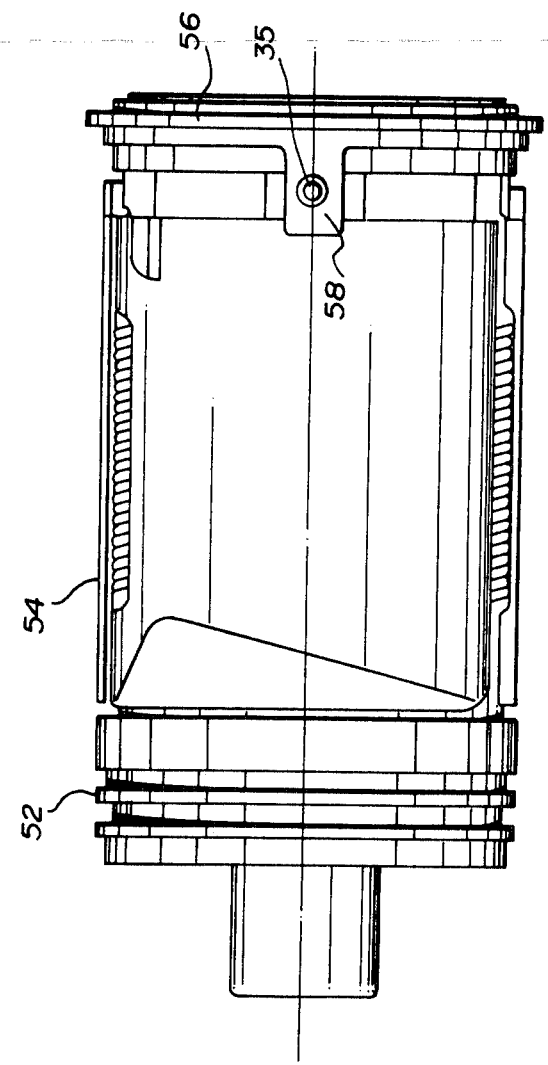

United States Patent [19]

Smith et al.

[11] 4,184,408
[45] Jan. 22, 1980

[54] SHEAR PIN RELEASE SYSTEM

[75] Inventors: Donald L. Smith, Ste. Foy; Michael N. Clark, Loretteville, both of Canada

[73] Assignee: Her Majesty the Queen in right of Canada, as represented by the Minister of National Defence, Canada

[21] Appl. No.: 915,283

[22] Filed: Jun. 13, 1978

[30] Foreign Application Priority Data

Sep. 7, 1977 [CA] Canada .................................. 286272

[51] Int. Cl.$^2$ .............................................. F16B 13/06
[52] U.S. Cl. ...................................... 89/1.806; 85/77; 85/82; 403/292
[58] Field of Search ................ 403/2, 297, 292; 85/77, 85/82, 88; 89/1.806, 1.807, 1.808; 72/391

[56] References Cited

U.S. PATENT DOCUMENTS

| | | | |
|---|---|---|---|
| 1,476,833 | 12/1923 | Pleister | 85/82 |
| 2,248,755 | 7/1941 | Hathorn | 85/82 |
| 2,366,965 | 1/1945 | Johnson | 85/82 |
| 3,130,629 | 4/1964 | Church | 85/82 |
| 3,605,549 | 9/1971 | Moskowitz et al. | 89/1.819 X |
| 3,820,297 | 6/1974 | Hurd | 403/2 |
| 4,003,288 | 1/1977 | Jeal | 85/77 |
| 4,026,189 | 5/1977 | Akhagen et al. | 89/1.806 X |
| 4,044,591 | 8/1977 | Powderly | 85/77 X |
| 4,046,053 | 9/1977 | Alvi et al. | 85/77 X |

*Primary Examiner*—David H. Brown
*Attorney, Agent, or Firm*—Larson, Taylor and Hinds

[57] ABSTRACT

A shear pin assembly suitable for use in a rocket retention and release system is provided. Each shear pin has a head and a shank with a passageway extending axially along the length of the shear pin. In the rocket release system, the shear pin connects a shear pin ring to the rear end of the rocket. A hole to receive the shear pin is provided in both the shear pin ring and the rear end of the rocket. The hole in the ring extends completely therethrough and has a diameter less than the diameter of the hole in the rocket. The passageway in the pin has parallel sides in longitudinal cross-section at the head end of the pin and sides which taper inwardly towards the shank end of the pin at the shank end. When the pin is inserted into the holes to connect the ring and rear end of the rocket together, the pin is expanded by a mandrel so that a shank end portion of the pin in the hole of the rocket fills the cross-section of the hole. Preferably a solid plug is then inserted in the passageway of the pin by means of a punch. When inserted in the pin, the plug is located entirely in the shank end portion of the pin located in the hole in the rear end of the rocket. Preferably the outer end of the inserted plug is located just below the shear plane formed between the ring and the rocket.

14 Claims, 10 Drawing Figures

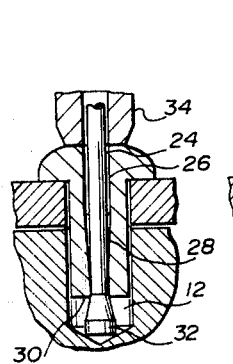
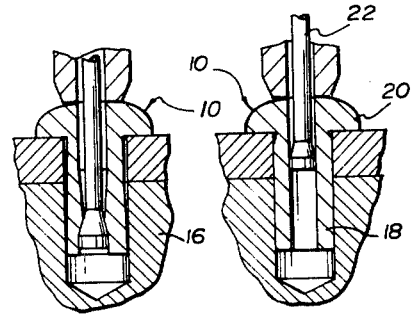
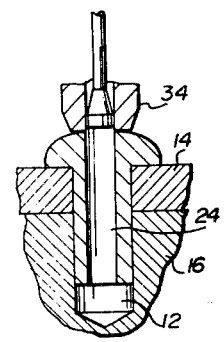
FIG. 1a PRIOR ART  FIG. 1b PRIOR ART  FIG. 1c PRIOR ART  FIG. 1d PRIOR ART
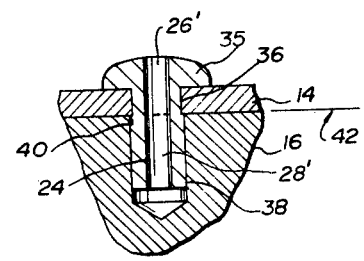
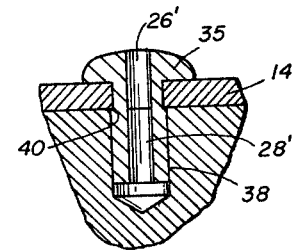
FIG. 2a  FIG. 2b
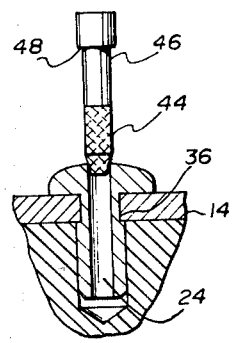
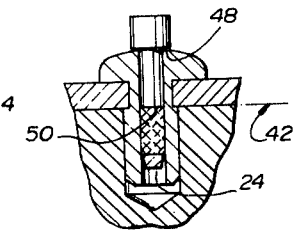
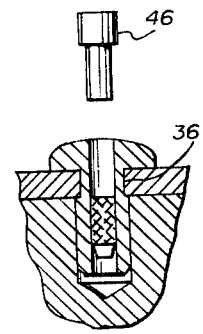
FIG. 3a  FIG. 3b  FIG. 3c

SHEAR PIN RELEASE SYSTEM

This invention relates to mechanical connections employing shear pins and in particular to a shear pin connection which is completed with the use of a mandrel drawn through a central axial passageway in the shear pin.

It is well known to connect close fitting parts together with the use of one or more shear pins so that at a certain specific load the connected parts will separate due to the shearing of the shear pins. One such use for shear pins is disclosed in commonly assigned U.S. Pat. No. 4,007,660 entitled "Rocket Retention and Ignition Assembly". As disclosed in that application, a rocket can be retained in a rocket launcher tube with the use of a shear pin ring having three lugs or tabs formed thereon through which shear pins extend. The three shear pins connect the ring to the side of the rocket nozzle at the rear end of the rocket. The shear ring disconnects from the remainder of the rocket when the rocket is fired. The force required to shear the shear pins can be accurately predetermined and therefore rocket release conditions can be accurately preset with the use of such shear pins and are therefore reproducible.

In many applications where shear pins are used, the shear pin must be capable of withstanding a certain shear force on the pin without failure but at a second predetermined shear force the pin must shear so that the parts or members connected by the shear pin will be able to separate or to shift relative to one another. In addition, in many applications the minimum shear load or force which the shear pin must be able to withstand is cyclical or vibratory in nature and this includes the application described in the aforementioned U.S. Patent.

A problem may be encountered with the use of a standard shear pin if the shear pin must be inserted into a blind hole, that is, a hole where the bottom is closed off so that the shear pin does not extend completely through the member where the hole is located. In such cases, it is necessary to fasten the shear pin in the hole from the side of the assembly from which the pin was inserted. One known method for accomplishing a connection of this sort involves the use of a blind rivet which can be inserted and expanded from one side of the two members being connected together. The connection can be completed by drawing a suitable mandrel through the central, axial passageway in the rivet. The mandrel expands the shank of the rivet so that it is locked in place and firmly connects the two members to be fastened together.

Another problem which may be encountered with the use of standard shear pins having a solid shank is that the ultimate bearing stress of the material used in the parts to be connected by the shear pin may not be sufficient to enable the shear pin to operate properly. Thus, one of the parts being connected by the shear pin may fail in bearing or tear before the maximum shear load or force is applied to the shear pin so that it will shear. This of course, is quite undesirable as it may very well result in the premature release or separation of the two parts. Such bearing stress problems may be particularly significant where it is desired to use relative low strength, inexpensive materials for one of the members being connected by the shear pin. In addition, the parts being connected by the shear pin may be subject to dimensional limitations because of their location or use. For example, the above mentioned shear ring used to connect a rocket in a rocket launcher is limited in its radial thickness in the vicinity of the shear pins because it must fit between the rocket nozzle and the rocket launching tube.

According to one aspect of the invention, a shear pin assembly includes first and second members to be connected together and a shear pin for connecting the first and second members. The shear pin has a head and a shank with a passageway extending axially along the length of the shear pin. A hole in each of the first and second members is provided to receive the shear pin, the hole in the first member extending completely therethrough and having a diameter less than the diameter of the hole in the second member. The passageway has parallel sides in longitudinal cross-section at the head end of the pin and sides which taper inwardly towards the shank end of the pin at the shank end. When the pin is inserted into both holes of the first and second members to connect the members, the pin is expandable by a mandrel so that a shank end portion of the pin in the hole of the second member fills the cross-section of the hole.

According to another aspect of the invention, a shear pin combination includes a shear pin for connecting first and second members together along a shear plane and a plug for insertion in the shear pin. The shear pin has a head and a shank with a passageway extending along the length of the shear pin. The pin is adapted for insertion into holes in the first and second members and for expansion of the outer diameter of the shank in the holes by means of a mandrel pulled through the passageway. The plug is able to fit in the passageway after expansion of the pin so that the plug in use is located entirely in a shank end portion of the pin located in the hole of one of the members.

A preferred embodiment of the invention will now be described in detail, by way of example, with reference to the accompanying drawings, wherein:

FIGS. 1(a) to 1(d), collectively referred to as FIG. 1, show the prior art method of employing a blind rivet and a mandrel to connect two members together;

FIGS. 2(a) and 2(b), collectively referred to as FIG. 2, are each an axial cross-section of a shear pin constructed in accordance with the present invention connecting two members together;

FIGS. 3(a) to 3(c), collectively referred to as FIG. 3, are a series of axial cross-section showing the manner in which a plug can be installed in the shear pin of FIG. 2;

FIG. 4 is a side view of the rear end of a rocket showing the manner in which the shear pin assembly of the invention can be used.

Referring first to FIG. 1, this figure shows the prior art method for fastening a blind rivet 10 in a hole 12 which extends through the first member 14 and a second member 16. The rivet 10 has a constant diameter shank 18 and a larger diameter head 20 which may be rounded on top as shown. The head 20 can, however, have a number of common shapes including flat, counter-sunk, round or oval. Before being fastened by a suitable mandrel 22 in the hole 12, the rivet has an axially extending passageway 24 consisting of two sections. The first section 26 has parallel side in longitudinal cross-section as shown in FIG. 1 and this first section extends through head 20 and partway into the shank 18. The second section 28 has sides which taper inwardly toward the shank end 30 of the pin and the second section is located at the shank end.

In order to install the rivet 10, the mandrel 22 is inserted through the passageway 24 from the bottom until the mandrel's head 32 engages the bottom of the blind rivet. The upper end of the mandrel is then clamped in a known tool capable of simultaneously pulling up on the mandrel and pushing down on the head 20 of the rivet. Only a bottom portion 34 of this tool is shown in FIG. 1. The mandrel with the rivet thereon is then inserted in the hole 12 in the manner shown in FIG. 1(a) the mandrel is now pulled up through the rivet 10 while the rivet is held in place by the bottom portion of the tool.

As shown in FIG. 1(b), because the diameter of the head of the mandrel is greater than the internal diameter of the passageway 24 at the bottom of the rivet, the rivet is expanded against the sides of the hole 12 in the second member 16. The taper of the second section 28 allows the material of the rivet which is compressed between the head of the mandrel 22 and the inner diameter of the hole to be displaced upwards so that the expanded rivet completely fills the hole as the mandrel comes completely through it (see FIG. 1(d)). The fastened rivet 10 is left with a uniform passageway having parallel sides and having a diameter equal to or slightly less than the diameter of the head of the mandrel. The rivet 10 is held in place by the friction between itself and the inner diameter of a hole 12.

If the blind rivet 10 is to be used as a shear pin capable of withstanding a specified shear load or shear force $F_1$, problems may arise if this load $F_1$ is cyclical or vibratory. Such loading may cause the expanded rivet to collapse back to its unexpanded form and this, of course, will allow the rivet to loosen in the hole 12 and eventually fall out. Furthermore, if a rivet 10 is designed to shear at a specified shear load or force $F_2$, problems may arise due to the hollow rivet collapsing prior to shearing. This in turn may undesirably delay the time in which separation of first and second members 14 and 16 take place.

An installed shear pin constructed in accordance with the present invention is shown in FIG. 2(a) and; as shown in FIG. 2(b) this shear pin 35 is similar in appearance to the blind rivet 10 prior to installation. In other words, prior to installation, pin 35 has a passageway divided into two sections, 26' 28' one of which, section 26' has parallel sides and the other of which, section 28', has sides which taper inwardly towards the shank end of the pin. The shear pin 35 is adapted to connect first and second members 14 and 16 together generally in the same manner as the rivet 10. However, it will be noted that the hole 36 extending through the first member 14 has a smaller diameter than the diameter of the hole 38 in the second member 16. The shear pin is constructed so that when expanded by the mandrel the shank portion of the pin in the second member 16 completely fills the cross-section of the hole 38. The filling of the hole can be assured by selecting suitable dimensions for the passageway 24 at the bottom of the shear pin and by selecting a suitable angle for the taper of the second section 28' in the shear pin. By arranging the diameters of the two holes 36, 38 and providing a suitable passageway 24 in the shear pin, a shoulder 40 is formed on the shank of the shear pin under the first member 14. This shoulder has the effect of positively locking the shear pin in place so that it is less likely to loosen in holes 36 and 38 and eventually fall out.

Preferably the length of the parallel section 26' in the passageway 24 of the shear pin prior to expansion thereof is chosen so as to be always traversed by the shear plane 42. It will be understood that the shear plane for the shear pin 35 is defined by the immediately adjacent surfaces of first and second members 14 and 16. The pin 35 will thus be sheared when a sufficient force causes the first and second members to move relative to one another in a direction parallel to the shear plane 42. In the event that there is a variation in the location of the shear plane 42 as a result for example, of a variation in the thickness of the first member 14, the extent of the parallel section 26' in the shear pin will ensure a constant shear area regardless.

The shear pin assembly shown in FIG. 2 is preferably used in association with a solid plug, the installation of which is shown in FIG. 3 of the drawings. The plug 44, which can be made out of metal such as steel, is installed in the passageway 24 with the use of a suitable punch 46. As the diameter of the plug 44 is slightly greater than the diameter of the head 32 of the mandrel, the plug will not simply slide into the passageway 24 but must be driven into it. The plug is inserted to a depth in the shear pin just below the shear plane 42 as shown in FIG. 3(b). A shoulder 48 on the punch 46 ensures that the plug will be inserted to the proper depth and no more. The portion of the punch 46 below the shoulder 48 can be made the same diamter of the plug. Because the plug must be forced into the passageway 24, a good friction fit between the plug and the inside of the shear pin is assured. It will be appreciated that the use of the solid plug 44 in passageway 24 prevents the lower portion of the shear pin 35 from collapsing under cyclical loading. Since this bottom portion cannot collapse and since the expanded outer diameter of the shear pin 35 in the second member 16 is greater than the hole 36 in the first member 14, the shear pin is positively locked in place and cannot loosen and fall out. In addition, because the upper surface of the plug 44 is located just below the shear plane, this upper surface 50 acts as an anvil so that the shear pin is able to shear cleanly. This ability of the shear pin assembly of the invention minimizes the delay in separating first and second members 14 and 16 when the specified shearing force is reached.

The aforementioned shear pin assembly and plug is particularly suitable for use in a rocket release and retention system and the manner of use in such a system is shown in FIG. 4 of the drawings. Only the rear portion of the rocket and the means for connecting said rear portion to the rocket launcher is shown in FIG. 4. Further details of the rocket and rocket launcher can be obtained from the aforementioned U.S. Pat. No. 4,007,660. These other details will not be described herein as they form no part of the present invention. The rear portion of the rocket includes a nozzle assembly 52 to which are attached three fins 54 which can pivot outwardly when the rocket is released from the launcher. A retention member or hear pin ring 56 is connected to the rear end of the nozzle assembly by means of three shear pins 35. The retention member 56 extends outwardly from the side of the rear end of the rocket so that the outwardly extending portion of the member can be clamped between an aft face of the rocket launcher and a removable retaining plate. It will be understood that the retention member 56 and the nozzle assembly 52 are analogous to the first and second members 14 and 16 shown in FIGS. 2 and 3. Three short lugs 58 (only one of which is shown in FIG. 4) extend from the retention member (shear ring) towards the front end of the rocket, each lug being spaced approximately 120° from the other lugs relative to the center axis of the shear ring. The shear ring including the lugs 58 is preferably an aluminum die casting in order to keep production costs low and therefore the lug material is very soft. In addition, the dimensions of the rocket nozzle assembly 52 and the launch tube of the rocket launcher are such that the radial thickness of the short lugs 58 in the region of the shear pins must be thin.

The rocket retention and release assembly comprising the shear ring or retention member 56, the nozzle member 52 and the shear pins must be capable of retaining the rocket in the rocket launcher when the rocket is subjected to vibratory loadings such as those caused by aerodynamic loading, shock loadings on take off and landing, and loads induced by aircraft manoevres. In addition, the aforementioned system must be capable of reliably releasing the rocket upon ignition. As the difference between the retention load ($F_1$) and the ignition thrust or release load ($F_2$) is relatively small, a "clean" reproducible mechanism is essential. Such a release mechanism is provided by the shear pin assembly described above in relation to FIGS. 2 and 3.

The embodiment of the invention in which an exclusive property or privilege is claimed are defined as follows:

1. A shear pin assembly comprising first and second members to be connected together, a shear pin for connecting said first and second members, said shear pin having a head and a shank with a passageway extending axially along the length of said shear pin, a hole to receive said shear pin in each of said first and second members, the hole in said first member extending completely therethrough and having a diameter less than the diameter of the hole in said second member, wherein said passageway has parallel sides in longitudinal cross-section at the head end of the pin and sides which taper inwardly towards the shank end of the pin at said shank end and, when the pin is inserted into both holes of said first and second members to connect said members, the pin is expandable by a mandrel so that a shank end portion of the pin in the hole of said second member fills the cross-section of the hole.

2. A shear pin assembly according to claim 1 wherein said first and second members are adapted for connection along a shear plane and, when connected by said shear pin, said shear plane extends through said shear pin in the region of said parallel sides.

3. A shear pin assembly according to claim 1 including a plug for insertion in said passageway after expansion of said pin and the connection of said first and second members.

4. A shear pin assembly according to claim 3 wherein said plug has a diameter slightly greater than the diameter of said passageway after expansion of said pin by said mandrel.

5. A shear pin assembly according to claim 4 wherein said plug when installed in said pin is located entirely in said shank end portion of the pin in the hole of said second member.

6. A shear pin combination comprising a shear pin for connecting first and second members together along a shear plane, said shear pin having a head and a shank with a passageway extending along the length of said shear pin, said shear pin being adapted for insertion into holes in said first and second members and for expansion of the outer diameter of said shank in said holes by means of mandrel pulled through said passageway, and a plug for insertion in said passageway after expansion of said pin, said plug in use being located intirely in a shank end portion of the pin located in the hole of one of said members.

7. A shear pin combination according to claim 6 wherein said plug is solid and has a diameter slightly greater than the diameter of said passageway after said expansion of said pin.

8. A shear pin combination according to claim 6 wherein said passageway has two axial sections with the section adjacent said head having parallel sides and the section adjacent the shank end having sides which taper inwardly towards the shank end of the pin.

9. A shear pin combination according to claim 8 wherein the parallel-sided section of the passageway extends completely through the head and part way along the shank, the length of the parallel-sided section in the shank being at least as great as the thickness of one of said members to be connected.

10. A rocket retention and release assembly comprising a first member forming means for connecting at least one shear pin to a rocket launcher, a second member forming part of the rear end of a rocket, at least one shear pin for connecting said first and second members together, the or each shear pin having a head and a shank with a passageway extending axially along the length of said shear pin, a first hole extending completely through said first member, a second hole in said second member having a diameter greater than the diameter of said first hole, wherein said passageway has parallel sides in longitudinal cross-section at the head end of the pin and sides which taper inwardly towards the shank end of the pin at said shank end and, when the pin is inserted into both holes of said first and second members to connect said members, the pin is expandable by a mandrel so that a shank end portion of the pin in the hole of said second member fills the cross-section of the hole.

11. A rocket retention and release assembly according to claim 10 wherein said first member is a ring which in use extends about the periphery of the rear end of the rocket and said member is a rocket nozzle member.

12. A rocket retention and release assembly according to claim 11 wherein said first member includes a tab extending perpendicularly from the plane of said ring, said first hole extending through said tab.

13. A rocket retention and release assembly according to claim 10, 11, or 12 including a solid plug for each shear pin for insertion in said passageway, said plug having a diameter slightly greater than said passageway after expansion of the pin.

14. A rocket retention and release assembly according to claim 10, 11, or 12 wherein said first and second members are connected together with at least two expanded shear pins, a solid plug is inserted in the passageway of each shear pin so that each plug lies entirely within holes formed in said second member, and one end of each plug is adjacent a shear plane formed between said first and second members.

* * * * *